US011810026B2

(12) United States Patent
Stillwell

(10) Patent No.: US 11,810,026 B2
(45) Date of Patent: Nov. 7, 2023

(54) PREDICTIVE DATA ANALYSIS USING VALUE-BASED PREDICTIVE INPUTS

(71) Applicant: Seacoast Banking Corporation of Florida, Stuart, FL (US)

(72) Inventor: Robert James Stillwell, Palm Beach Gardens, FL (US)

(73) Assignee: Seacoast Banking Corporation of Florida, Stuart, FL (US)

( * ) Notice: Subject to any disclaimer, the term of this patent is extended or adjusted under 35 U.S.C. 154(b) by 1086 days.

(21) Appl. No.: 16/386,913

(22) Filed: Apr. 17, 2019

(65) Prior Publication Data

US 2019/0325327 A1    Oct. 24, 2019

Related U.S. Application Data

(60) Provisional application No. 62/660,100, filed on Apr. 19, 2018.

(51) Int. Cl.
*G06Q 10/04* (2023.01)
*G06Q 40/02* (2023.01)

(52) U.S. Cl.
CPC ............. *G06Q 10/04* (2013.01); *G06Q 40/02* (2013.01)

(58) Field of Classification Search
None
See application file for complete search history.

(56) References Cited

U.S. PATENT DOCUMENTS 7,742,996 B1 * 6/2010 Kwan .................. G06Q 20/045
705/72
7,756,676 B1 * 7/2010 Shan .................... G06F 16/2477
702/182

(Continued)

FOREIGN PATENT DOCUMENTS

GB          2547993 A  *  9/2017  .......... G06F 3/0485
WO     WO-2015/127065 A1    8/2015

OTHER PUBLICATIONS

Quantile regression, Wikipedia, archives org, Feb. 20, 2017 https://web.archive.org/web/20170220232500/https://en.wikipedia.org/wiki/Quantile_regression (Year: 2017).*

(Continued)

*Primary Examiner* — Octavian Rotaru
(74) *Attorney, Agent, or Firm* — Alston & Bird LLP

(57) ABSTRACT

There is a need for solutions that perform predictive data analysis using a value-based predictive input. This need can be addressed by, for example, determining, based at least in part on the value-based predictive input, a plurality of predictive component values; for each predictive component value of the plurality of predictive component values: obtaining a quantile regression distribution for the predictive component value; determining, based at least in part on the quantile regression distribution, a non-outlier portion of the quantile regression distribution; generating, for each quantile regression value of the one or more quantile regression values that is associated with the non-outlier portion, a scaled quantile regression value; and determining, based at least in part on each scaled quantile regression value for a quantile regression value associated with a predictive component value of the plurality of predictive component values, an entity opportunity prediction of the one or more entity predictions for the prediction entity.

20 Claims, 10 Drawing Sheets

(56) References Cited

U.S. PATENT DOCUMENTS

| | | | |
|---|---|---|---|
| 8,548,909 B1* | 10/2013 | Snow | G06F 16/986 |
| | | | 715/201 |
| 2005/0273419 A1* | 12/2005 | Ogg | G06Q 40/04 |
| | | | 705/37 |
| 2009/0024427 A1* | 1/2009 | Shan | G06Q 30/0201 |
| | | | 705/7.29 |
| 2009/0198618 A1* | 8/2009 | Chan | G06F 21/445 |
| | | | 707/E17.014 |
| 2011/0029430 A1* | 2/2011 | Norris | G06Q 30/0224 |
| | | | 705/39 |
| 2013/0036036 A1* | 2/2013 | Zoldi | G06Q 30/0224 |
| | | | 705/35 |
| 2014/0053135 A1 | 2/2014 | Bird et al. | |
| 2014/0108994 A1 | 4/2014 | Medlock et al. | |
| 2014/0278051 A1 | 9/2014 | McGavran et al. | |
| 2014/0344023 A1* | 11/2014 | Chiu | G06Q 30/0206 |
| | | | 705/7.35 |
| 2016/0142256 A1* | 5/2016 | Yang | H04L 41/12 |
| | | | 709/223 |
| 2017/0206466 A1* | 7/2017 | Zoldi | G06F 18/2132 |
| 2018/0181541 A1* | 6/2018 | Yao | G06F 17/11 |
| 2018/0330390 A1* | 11/2018 | Malaviya | G06Q 30/0202 |
| 2018/0365298 A1* | 12/2018 | Poghosyan | G06F 11/3419 |
| 2019/0272522 A1* | 9/2019 | Silverman | G06Q 40/02 |

OTHER PUBLICATIONS

International Searching Authority, International Search Report and Written Opinon for International Application No. PCT/IB2019/053242, dated Aug. 29, 2019, (9 pages), Russia.

\* cited by examiner

FIG. 7

PREDICTIVE DATA ANALYSIS USING VALUE-BASED PREDICTIVE INPUTS

CROSS-REFERENCES TO RELATED APPLICATIONS

This application claims priority to and the benefit of U.S. Provisional Patent Application No. 62/660,100, filed Apr. 19, 2018; the contents of which as are hereby incorporated herein by reference in their entirety.

BACKGROUND

Predictive data analysis problems in many transactional domains (e.g., financial domains, healthcare domains, internet browsing record processing domains, etc.) present unique challenges because of various qualities of such domains, such as the large amount of underlying transactional information/data in such domains and the high complexity of such underlying transactional information/data. Because of the noted challenges, there continues to be a need for efficient and reliable predictive data analysis techniques that are adapted to complex requirements of many technical domains and/or special structures and/or formats of data utilized in many transactional domains.

BRIEF SUMMARY

In general, embodiments of the present invention provide methods, apparatus, systems, computing devices, computing entities, and/or the like for predictive data analysis using value-based predictive inputs. Certain embodiments utilize systems, methods, and computer program products predictive data analysis on predictive data entities based at least in part on entity-level data associated with the predictive data entities, such as entity-level value-based information/data associated with the predictive data entities.

In accordance with one aspect, a method is provided. In one embodiment, the method comprises determining, based at least in part on the value-based predictive input, a plurality of predictive component values; for each predictive component value of the plurality of predictive component values: obtaining a quantile regression distribution for the predictive component value, wherein the quantile regression distribution indicates a distribution of the first component across the plurality of prediction entities via a plurality of quantile regression values, determining, based at least in part on the quantile regression distribution, a non-outlier portion of the quantile regression distribution, and generating, for each quantile regression value of the one or more quantile regression values that is associated with the non-outlier portion, a scaled quantile regression value; determining, based at least in part on each scaled quantile regression value for a quantile regression value associated with a predictive component value of the plurality of predictive component values, an entity opportunity prediction of the one or more entity predictions for the prediction entity; and presenting a prediction report associated with the one or more entity predictions to a user device.

In accordance with another aspect, a computer program product is provided. The computer program product may comprise at least one computer-readable storage medium having computer-readable program code portions stored therein, the computer-readable program code portions comprising executable portions configured to determine, based at least in part on the value-based predictive input, a plurality of predictive component values; for each predictive component value of the plurality of predictive component values: obtain a quantile regression distribution for the predictive component value, wherein the quantile regression distribution indicates a distribution of the first component across the plurality of prediction entities via a plurality of quantile regression values, determine, based at least in part on the quantile regression distribution, a non-outlier portion of the quantile regression distribution, and generate, for each quantile regression value of the one or more quantile regression values that is associated with the non-outlier portion, a scaled quantile regression value; determine, based at least in part on each scaled quantile regression value for a quantile regression value associated with a predictive component value of the plurality of predictive component values, an entity opportunity prediction of the one or more entity predictions for the prediction entity; and present a prediction report associated with the one or more entity predictions to a user device.

In accordance with yet another aspect, an apparatus comprising at least one processor and at least one memory including computer program code is provided. In one embodiment, the at least one memory and the computer program code may be configured to, with the processor, cause the apparatus to determine, based at least in part on the value-based predictive input, a plurality of predictive component values; for each predictive component value of the plurality of predictive component values: obtain a quantile regression distribution for the predictive component value, wherein the quantile regression distribution indicates a distribution of the first component across the plurality of prediction entities via a plurality of quantile regression values, determine, based at least in part on the quantile regression distribution, a non-outlier portion of the quantile regression distribution, and generate, for each quantile regression value of the one or more quantile regression values that is associated with the non-outlier portion, a scaled quantile regression value; determine, based at least in part on each scaled quantile regression value for a quantile regression value associated with a predictive component value of the plurality of predictive component values, an entity opportunity prediction of the one or more entity predictions for the prediction entity; and present a prediction report associated with the one or more entity predictions to a user device.

BRIEF DESCRIPTION OF THE DRAWINGS

Figure 1:
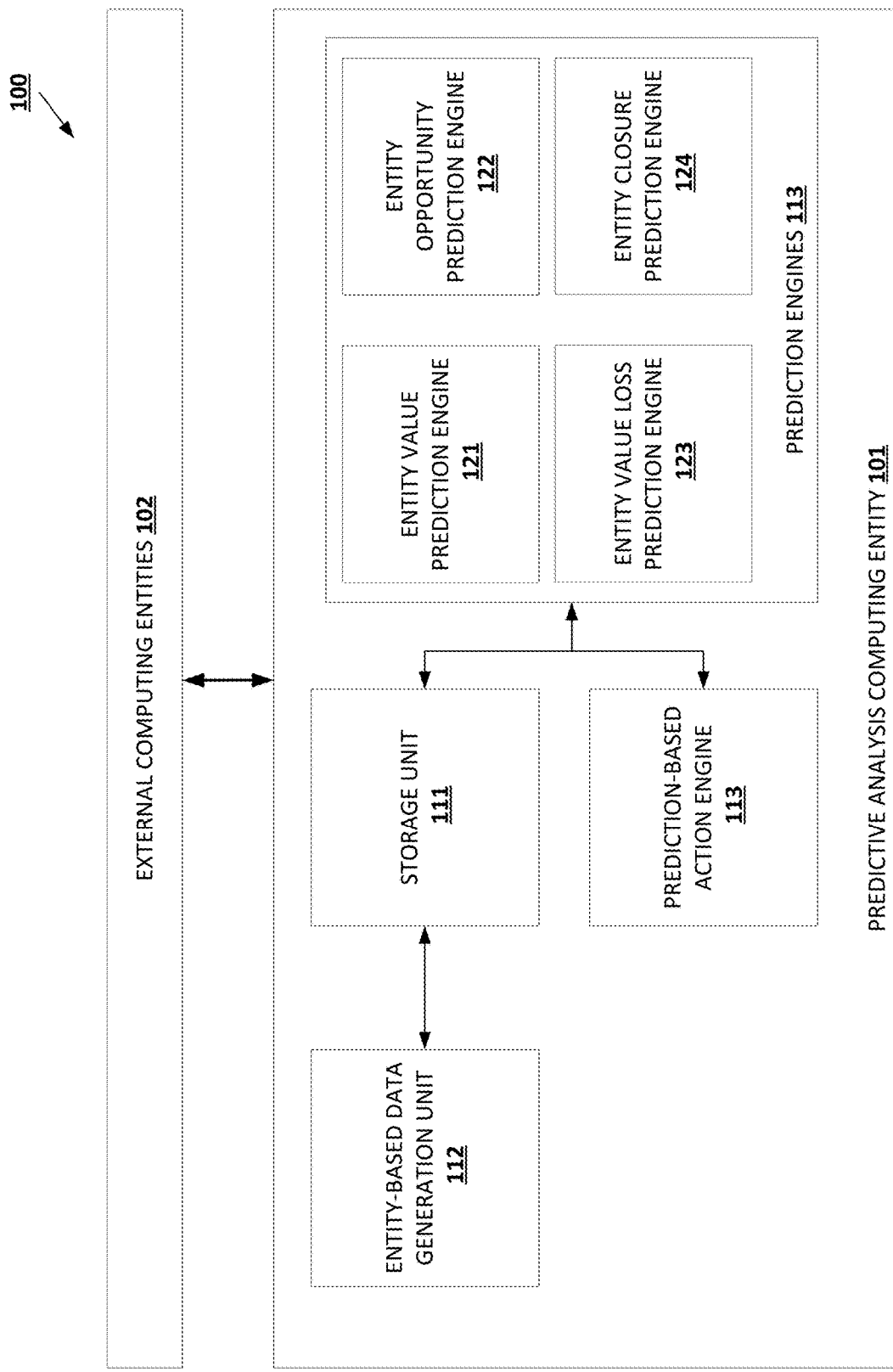

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
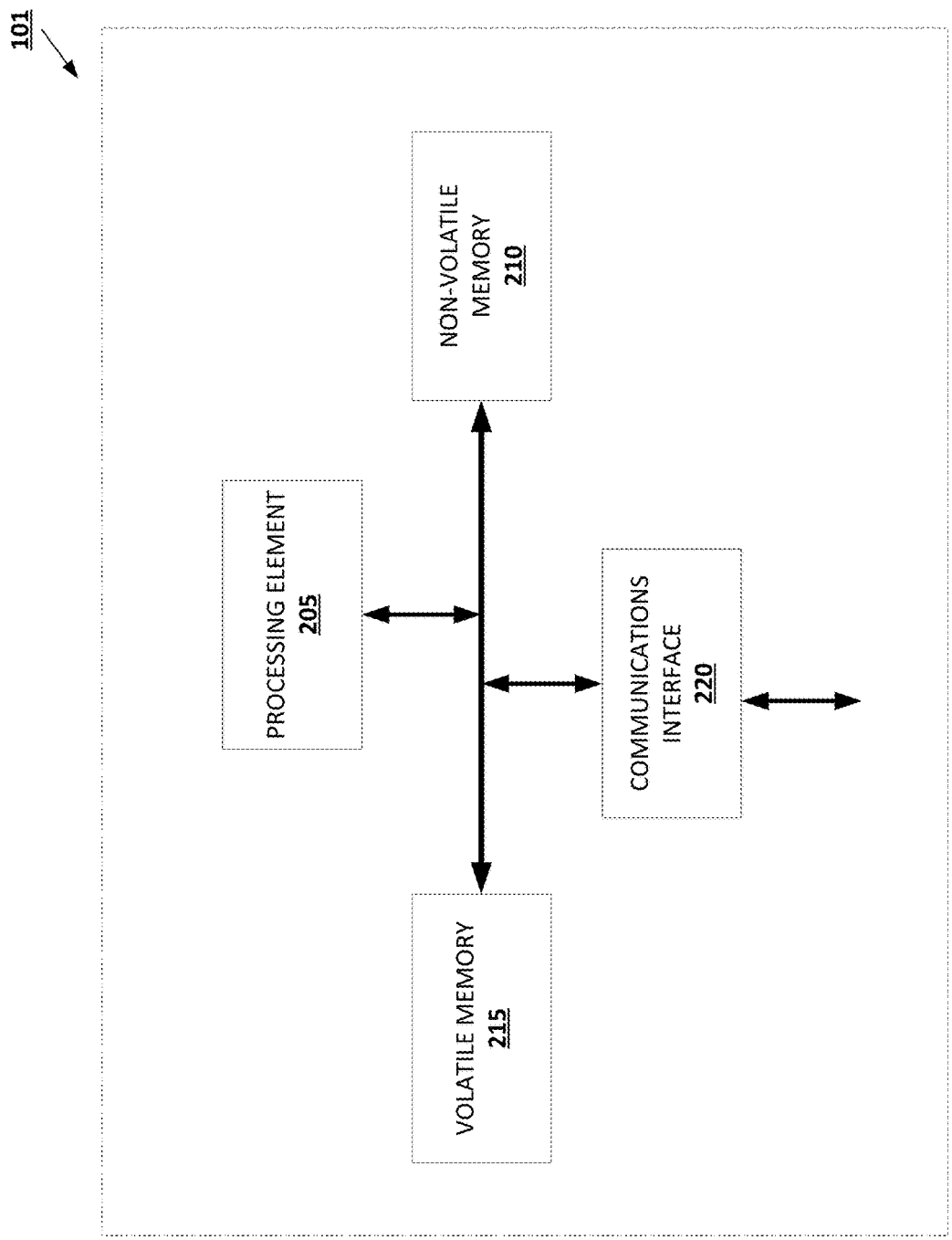

FIG. 2 provides an example predictive analysis computing entity in accordance with some embodiments discussed herein.

Figure 3:
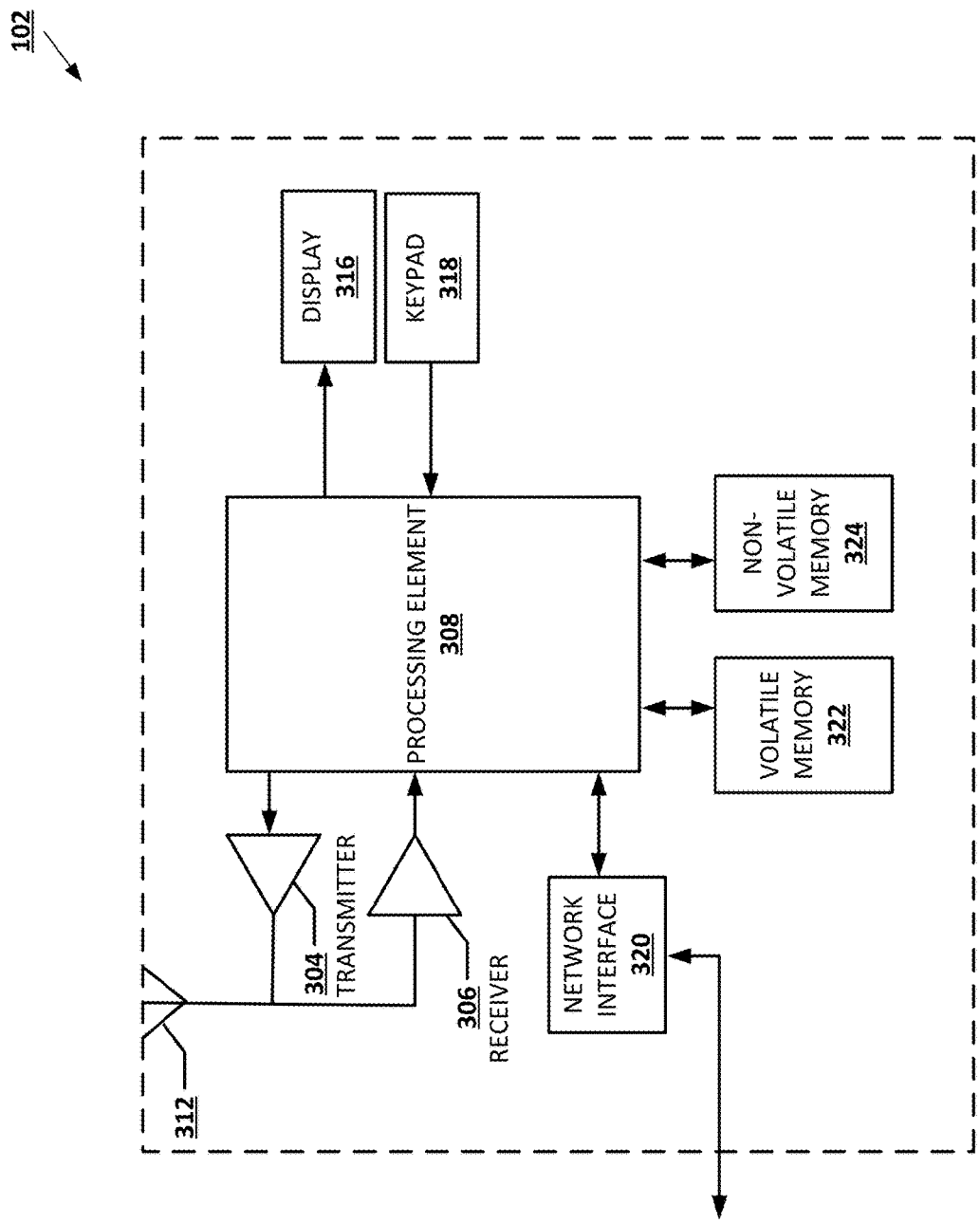

FIG. 3 provides an example external computing entity in accordance with some embodiments discussed herein.

Figure 4:
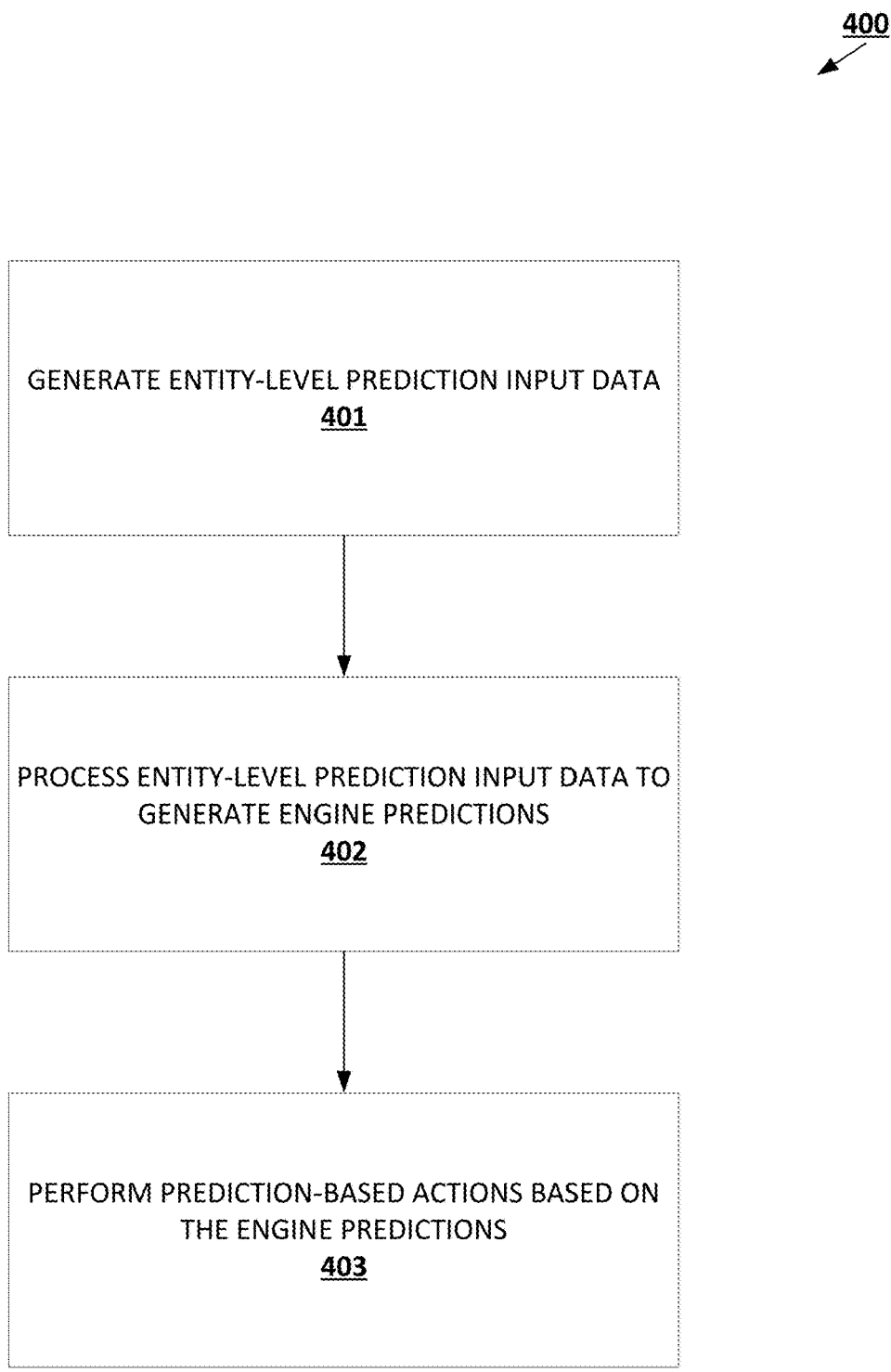

FIG. 4 provides a flowchart diagram of a process for performing predictive data analysis in accordance with some embodiments discussed herein.

Figure 5:
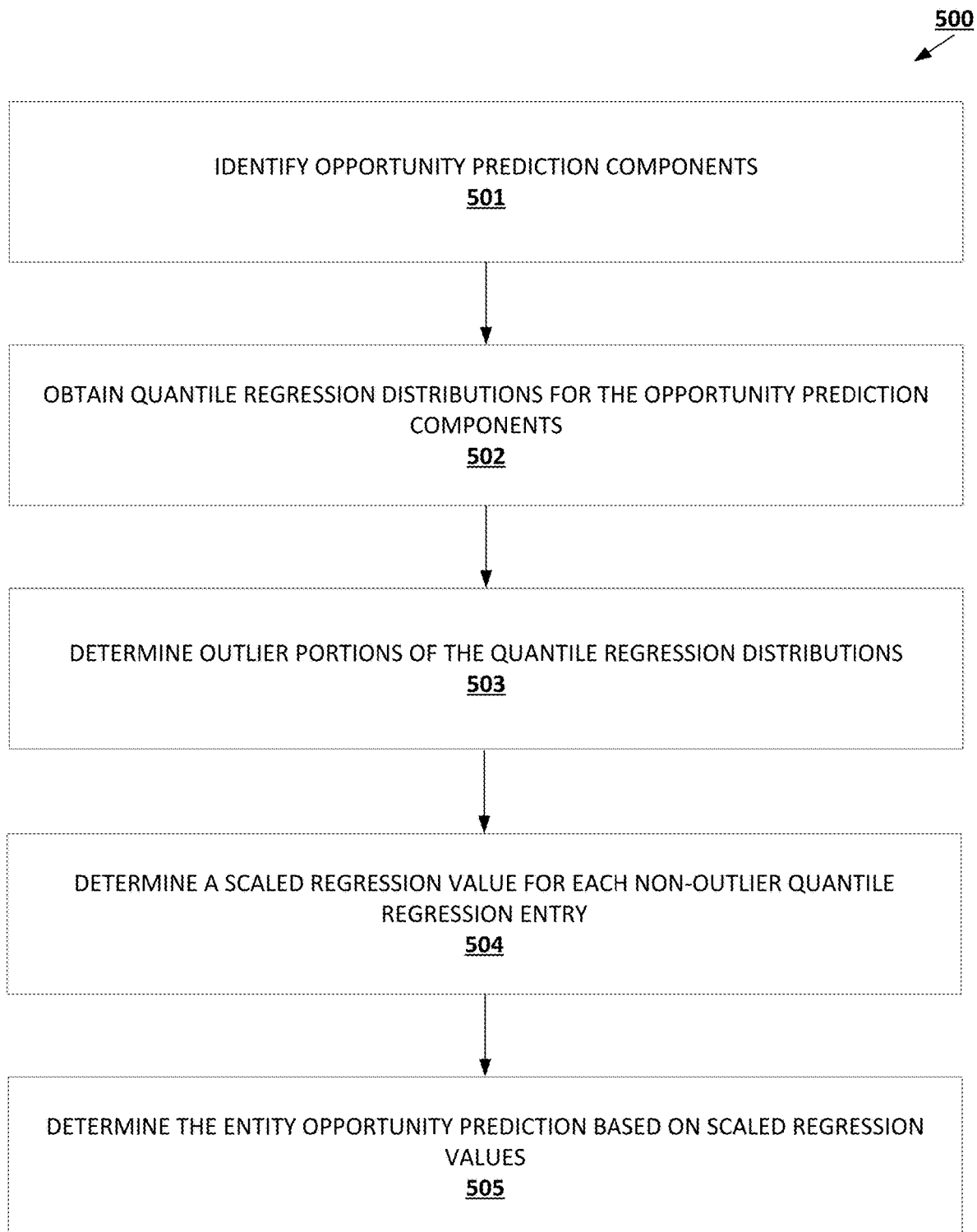

FIG. 5 provides a flowchart diagram of a process for generating an entity opportunity prediction in accordance with some embodiments discussed herein.

Figure 6:
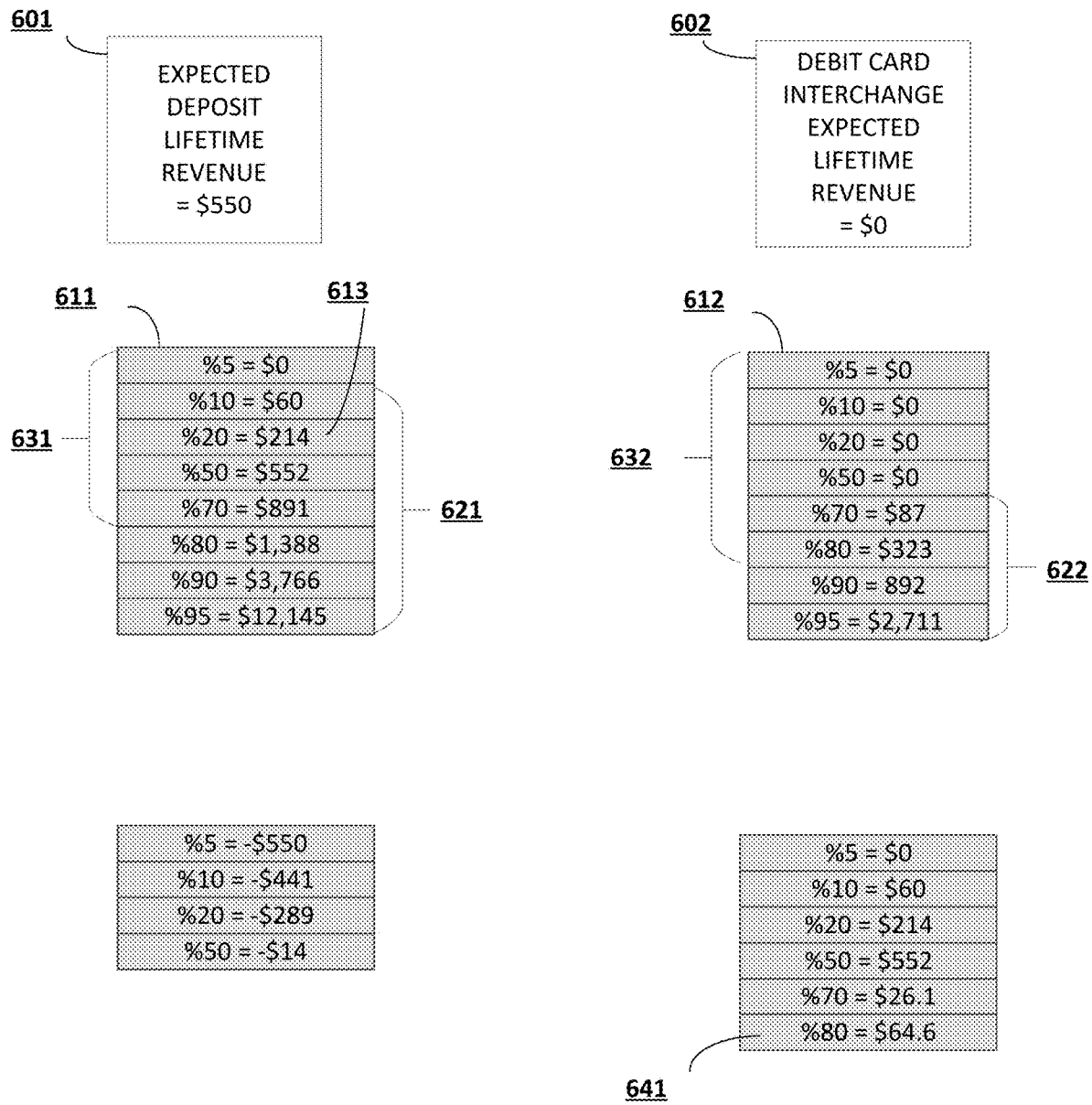

FIG. 6 provides an operational example of generating an entity opportunity prediction in accordance with some embodiments discussed herein.

FIG. 7 provides an operational example of an interactive user interface display a branch performance table in accordance with some embodiments discussed herein.

Figure 8:

FIG. 8 provides an operational example of a dynamic customer life-time value report portal in accordance with some embodiments discussed herein.

Figure 9:
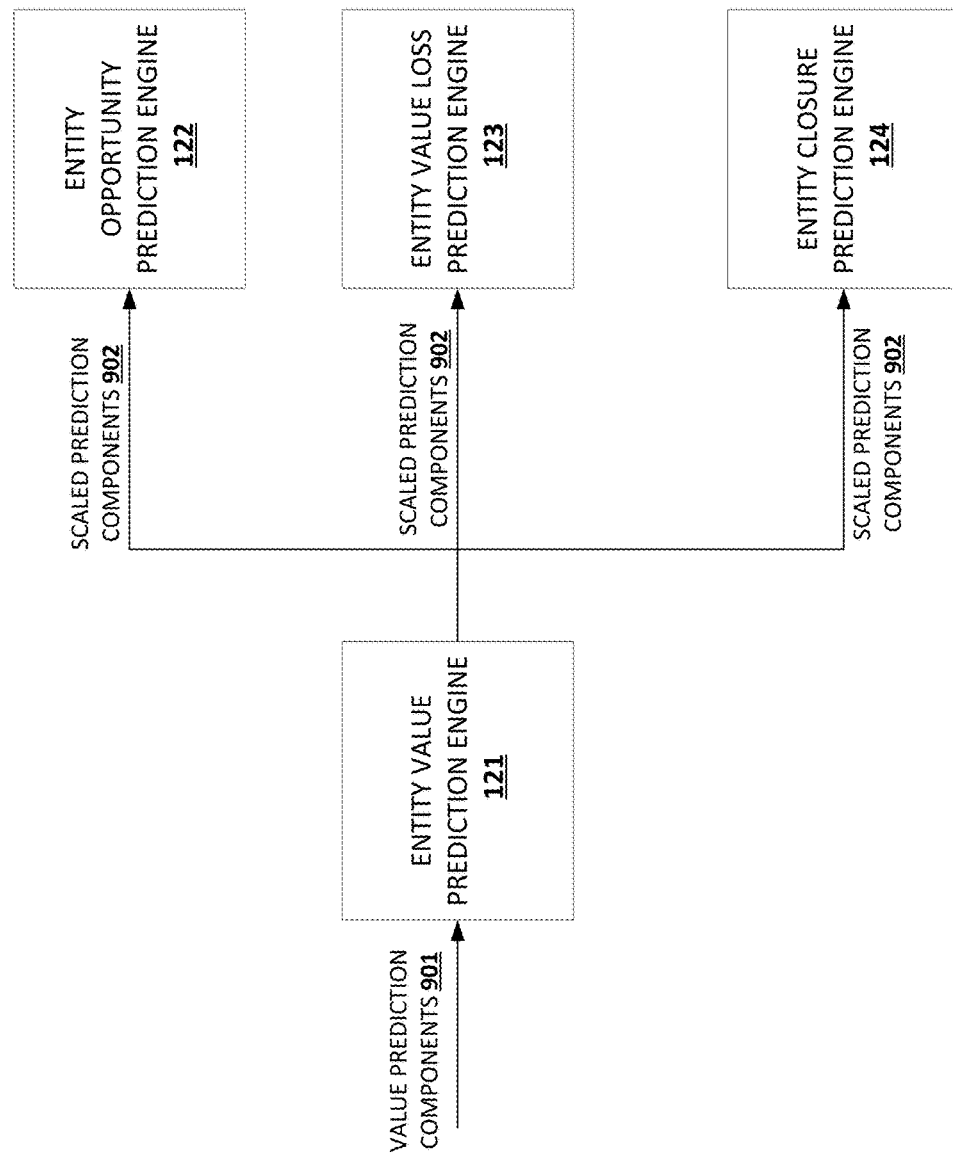

FIG. 9 provides a data flow diagram of an example process for generating engine predictions in accordance with some embodiments discussed herein.

Figure 10:
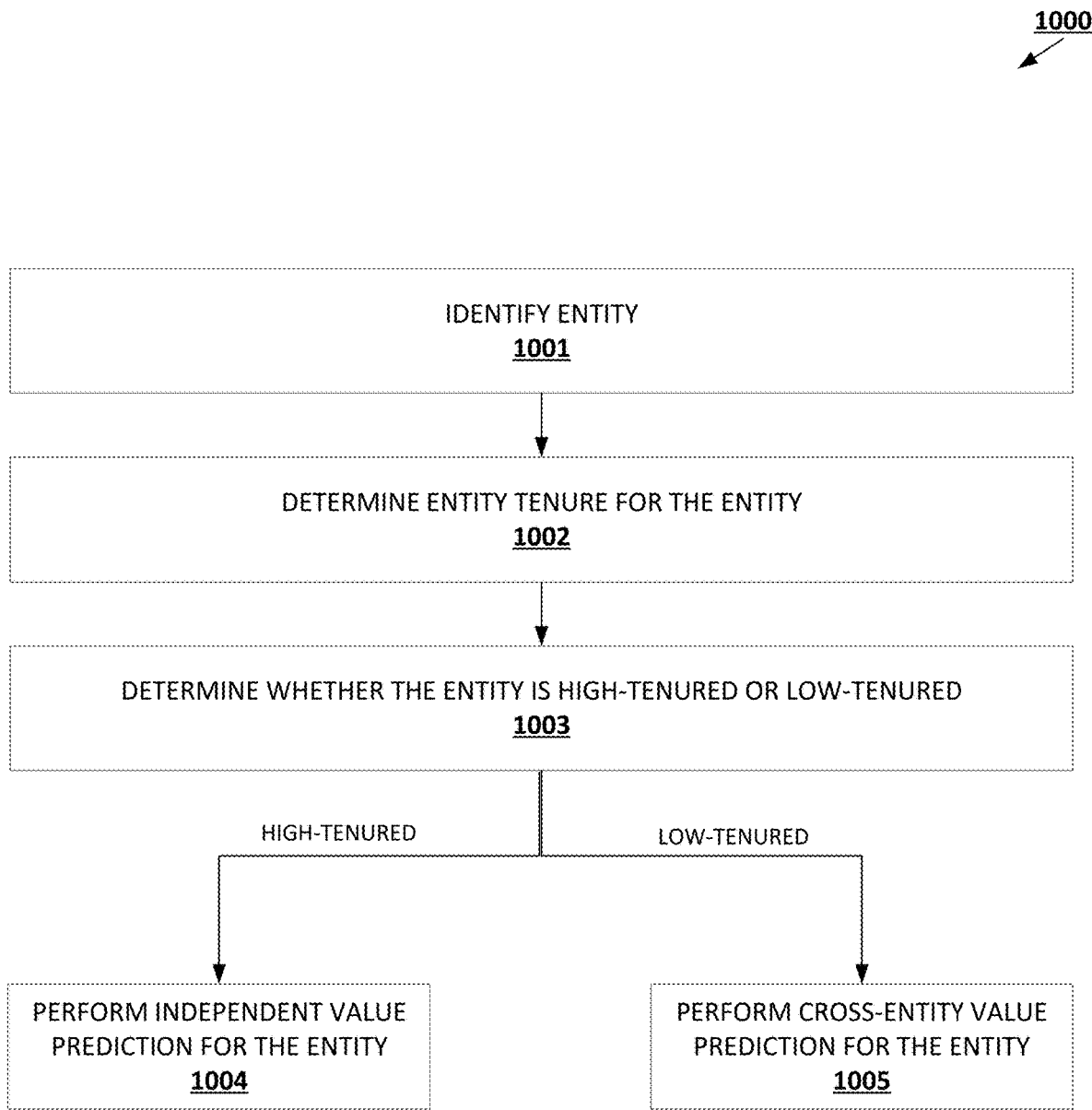

FIG. 10 provides a flowchart diagram of an example process for generating entity value predictions in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed embodiments can be used to perform other types of data analysis.

I. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

As shown in FIG. 1, the architecture 100 includes one or more external computing entities 102 that interact with one or more predictive analysis computing entities 101 via a communication network (not shown).

A. Exemplary Predictive Analysis Computing Entity

FIG. 2 provides a schematic of a predictive analysis computing entity 101 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive analysis computing entity 101 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive analysis computing entity 101 may include or be in communication with one or more processing elements 205 (also referred to as processors, processing circuitry, and/or similar terms used herein interchangeably) that communicate with other elements within the predictive analysis computing entity 101 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive analysis computing entity 101 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive analysis computing entity 101 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive analysis computing entity 101 with the assistance of the processing element 205 and operating system.

As indicated, in one embodiment, the predictive analysis computing entity 101 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive analysis computing entity 101 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive analysis computing entity 101 may include or be in communication with one or more input elements, such as a keyboard input, a mouse input, a touch screen/display input, motion input, movement input, audio input, pointing device input, joystick input, keypad input, and/or the like. The predictive analysis computing entity 101 may also include or be in communication with one or more output elements (not shown), such as audio output, video output, screen/display output, motion output, movement output, and/or the like.

As will be appreciated, one or more of the predictive analysis computing entity's 101 components may be located remotely from other predictive analysis computing entity 101 components, such as in a distributed system. Furthermore, one or more of the components may be combined and additional components performing functions described herein may be included in the predictive analysis computing entity 101. Thus, the predictive analysis computing entity 101 can be adapted to accommodate a variety of needs and circumstances. As will be recognized, these architectures and descriptions are provided for exemplary purposes only and are not limiting to the various embodiments.

The predictive analysis computing entity 101 may be configured to, in response to requests by the external computing entities 102, generate predicted business intelligence conclusions for a variety of transactional entities associated with a transactional network. Examples of such predicted business intelligence conclusions include entity value predictions, entity opportunity predictions, entity value loss predictions, and entity closure predictions, as further described below. The predictive analysis computing entity 101 may further be configured to perform one or more prediction-based actions based at least in part on the generated predicted business intelligence conclusions. Examples of such predicted actions may include information/data presentation, report generation, and lead generation, as further described below.

For example, in some embodiments, the predictive analysis computing entity 101 may be configured to generate predicted business intelligence conclusions for transactional entities involved in a transactional network associated with a bank, such as bank customers, bank branches, bank accounts, and/or the like. In some of those embodiments, the predictive analysis computing entity 101 may be configured to generate entity value predictions for bank customers, entity opportunity predictions for bank customers, entity value loss predictions for bank customers, an entity closure predictions for bank branches. In some embodiments, an entity value prediction for a bank customer describes an expected financial value expected to be brought by the particular bank customer over a period of time (e.g., over a lifetime of the particular bank customer); an entity opportunity prediction for a bank customer describes one or more predicted value increase opportunity areas for the particular bank customer, an entity value loss prediction for a bank customer describes a predicted value loss probability for the bank customer, and an entity closure prediction for a bank branch describes a predicted effect of the closure of the bank branch on one or more customer-related predictions, such as one or more customer value predictions, one or more customer opportunity predictions, and/or one or more customer value loss predictions. However, although various embodiments of the present invention are described herein with reference to transactional networks associated with banks or other financial institutions, a person of ordinary skill in the art will recognize that the disclosed techniques can be utilized to generate predicted business intelligence predictions and/or perform prediction-based actions for any transactional network, such as a commercial transactional network, a medical transactional network, a scholastic transactional network, a social media transactional network, and/or the like.

The predictive analysis computing entity 101 may comprise a storage unit 111, an entity-level data generation unit 112, a prediction-based action engine 114, as well as a number of prediction engines 113, such as an entity value prediction engine 121, an entity opportunity prediction engine 122, an entity value loss prediction engine 123, and an entity closure prediction engine 124. The storage unit 111 may store raw transactional data entries that each may describe an aspect of transactional reality in the transactional network associated with the predictive analysis computing entity 101, such as values for individual financial transactions, values for various bank accounts, and/or the like. The storage unit 111 may further store entity-level prediction input information/data that each describe at least one transactional reality associated with an entity, such as bank-customer-level information/data describing at least one transactional reality (e.g., most active deposit account) associated with various bank customers. In some embodiments, the entity-level prediction input may be generated by the entity-level data generation unit 112 via processing at least a portion of the raw transactional information/data stored on the storage unit 111.

Each prediction engine 113 may be associated with a prediction model that defines (e.g., via one or more prediction parameters) one or more operations for processing the entity-level prediction input information/data stored on the storage unit 111 to generate one or more engine predictions. For example, the entity value prediction engine 121 may be configured to process the entity-level prediction input information/data to generate one or more entity value predictions. As another example, the entity opportunity prediction engine 122 may be configured to process the entity-level prediction input information/data to generate one or more entity opportunity predictions. As yet another example, the entity value loss prediction engine 123 may be configured to process the entity-level prediction input information/data to generate one or more entity value loss predictions. As a further example, the entity closure prediction engine 124 may be configured to process the entity-level prediction input information/data to generate one or more entity closure predictions.

The prediction-based action engine 114 may be configured to use the predicted business intelligence conclusions to perform one or more actions, such as generate one or more reports and assign tasks to users (e.g., employees) tasked with utilizing business insight contained in the predicted business intelligence conclusions to achieve business goals. In some embodiments, the prediction-based action engine 114 uses the predicted business intelligence conclusions to assign promotional leads to particular promotional managers. In some embodiments, the prediction-based action engine 114 uses the predicted business intelligence conclusions to generate one or more promotional opportunity alerts. In some embodiments, the prediction-based action engine 114 uses the predicted business intelligence conclusions to generate and/or perform one or more customer outreach campaigns, e.g., one or more automated customer outreach campaigns, such as one or more automated promotional outreach campaigns.

B. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive analysis computing entity 101. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive analysis computing entity 101 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 121 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive analysis computing entity 101, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive analysis computing entity 101 and/or various other computing entities.

In another embodiment, the external computing entity 102 may include one or more components or functionality that are the same or similar to those of the predictive analysis computing entity 101, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In some embodiments, the external computing entity 102 may utilize at least one machine learning models, such as a trained machine learning model. In some embodiments, utilizing a trained machine learning model includes training the machine learning model, e.g., training the machine learning model using a training algorithm such as gradient descent, gradient descent with backpropagation, and/or gradient descent with backpropagation over time.

In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event. For example, the AI computing entity may be configured to retrieve and/or execute a particular program (e.g., the described cognitive evaluation game) in response to an audible, vocal request from a user (e.g., a user speaking an instruction to the AI computing entity to execute the particular program).

III. Overview

Discussed herein methods, apparatus, systems, computing devices, computing entities, and/or the like for predictive data analysis using value-based predictive input information/data. As will be recognized, however, the disclosed embodiments can be used to perform any type of predictive data analysis, such as predictive data analysis with entity-level data other than value-based predictive input information/data.

A. Technical Problems

Predictive data analysis problems in many transactional domains (e.g., financial domains, healthcare domains, internet browsing record domains, and/or the like) present significant challenges because of at least characteristics qualities of such domains: the large amount of underlying data in such domains, the high complexity of underlying data in such fields, and the difficulty of integrating value-based predictive input information/data into many conventional predictive data analysis techniques. The first characteristic (e.g., the large amount of underlying transactional information/data that may be used for predictive data analysis in transactional domains) manifests itself both in the size of underlying transactional information/data and the rate of growth of such underlying transactional information/data. Because of the large amounts of underlying transactional information/data in transactional domains, predictive data analysis in such domains often requires adoption of substantially efficient predictive data analysis algorithms that do utilize complex operations, such as complex non-linear operations. Moreover, because of the high rate of growth of the underlying transactional information/data where the data corpus may increase at substantial rates daily or even hourly, effective predictive data analysis models that have substantial training or re-training costs are not conducive for many predictive data analysis problems in transactional domains.

The second characteristic of many transactional domains noted above (e.g., the high complexity of underlying data in such fields) creates data corpuses that, while being structured, do not have tightly-defined structures that is easily conducive to many predictive feature extraction techniques.

For example, financial transactional records may have some structures but those structures may not be easily convertible to meaningful features for predictive data analysis algorithms. As a result, many transactional information/data corpuses include various bodies of data each with their own unique and often complex schema, often with multiple dimensions. As a result, conventional predictive data analysis techniques often fail to effectively and efficiently perform predictive data analysis in many transactional domains.

The third characteristic of transactional domains noted above (e.g., the difficulty of integrating value-based predictive input information/data into many conventional predictive data analysis techniques) further complicates the use of conventional predictive data analysis techniques in many transactional domains. For example, many conventional predictive data analysis approaches do not enable using customer lifetime values and/or the data used to compute customer lifetime values in generating predictive data analysis conclusions. Moreover, many conventional predictive data analysis approaches do not enable performing reliable statistical inferences to distinguish between various data components used to calculate such customer lifetime values.

Thus, as described above, three characteristics of many transactional domains (e.g., the large amount of underlying information/data in such domains, the high complexity of underlying information/data in such fields, and the difficulty of integrating value-based predictive input information/data into many conventional predictive data analysis techniques) create substantial difficulties for performing predictive data analysis tasks in such domains. Thus, there continues to be a need for efficient and effective predictive data analysis techniques that are adapted to complex requirements of many technical domains and/or special structures and/or formats of data utilized many transactional domains.

B. Technical Solutions

Various embodiments of the present invention address technological challenges related to the need for efficient and effective predictive data analysis techniques that are adapted to complex requirements of many technical domains and/or special structures and/or formats of data utilized in many transactional domains in light of some features of those domains. For example, various embodiments of the present invention present techniques for generating, based at least in part on transactional information/data, predictive input information/data at a predictive-entity level. Examples of such entity-level predictive input information/data include value-based entity-level predictive input information/data. Through disclosing such innovative techniques for generating entity-level predictive inputs, various embodiments of the present invention address many problems posed by the large size of underlying transactional information/data as well as high complexity of underlying transactional information/data for predictive data analysis in transactional domains.

For example, by generating entity-level prediction input information/data, various embodiments of the present invention reduce both size and dimensionality of underlying transactional information/data associated with many transactional domains, in turn creating effective feature data structures that can be used with many predictive data analysis algorithms. Moreover, by generating entity-level prediction input information/data based at least in part on aggregation of underlying data, various embodiments of the present invention create more representative features for many transactional records, which in turn enable more accurate and reliable predictive data analysis in many transactional domains. Thus, by generating entity-level prediction input information/data, various embodiments of the present invention address technical challenges related to efficiency and reliability of predictive data analysis in transactional domains and substantially improve existing technologies for predictive data analysis in such domains.

Moreover, various embodiments of the present invention address technical challenges related to reliability of predictive data analysis approaches used to perform such analysis in many transactional domains because of the inability of many such conventional predictive data analysis models to integrate value-based prediction input data entries. Contrary to many conventional predictive data analysis concepts that fail to properly and reliably integrate value-based prediction input information/data as features used in their predictive modeling, various embodiments of the present invention use value-based predictive input information/data (e.g., such as customer lifetime value components) to perform a variety of predictive computations, including to generate predictive opportunity predictions for predictive entities. In some embodiments, the techniques provided and discussed herein integrating value-based models in a manner that takes into account the distribution of such value-based information/data, for example, outlier designations for such value-based information/data. Through such approaches, various embodiments of the present invention address reliability problems associated with many existing predictive data analysis problems resulting from the inability of many conventional predictive data analysis models to integrate value-based prediction input information/data and improve existing technologies for predictive data analysis in many technical domains.

IV. Exemplary System Operation

The operation of various embodiments of the present invention will now be described. As discussed herein, various embodiments are directed to systems and methods for database entity sensitivity classification. Various embodiments of the disclosed techniques enable entity sensitivity classification by using database element identifiers (e.g., relational database column names) associated with database entities (e.g., relational database tables).

Generating Entity-Level Data

FIG. 4 is a flow diagram of an example process 400 for generating predicted business intelligence conclusions for an entity in a transactional network. Via the various steps/operations of the process 400, a computing entity (e.g., the predictive analysis computing entity 101) can generate predicted business intelligence conclusions based at least in part on entity-level prediction input information/data.

The process 400 begins at step/operation 401 when the entity-level data generation unit 112 generates entity-level prediction input information/data. To generate entity-level entity prediction data, the entity-level data generation unit 112 may process raw transactional information/data in accordance with one or more entity-level data aggregation rules. In some embodiments, one objective of this step/operation is to transform minimally structured raw transactional information/data into highly structured entity-level prediction input information/data defined based at least in part on an entity-centered organization of the underlying transactional information/data. For example, the entity-level data generation unit 112 may generate customer-level prediction input information/data that include various data structures each associated with a particular customer and including with one or more prediction input data entries associated with the particular customer.

In some embodiments, to generate an entity-level prediction input data entry associated with a particular entity, the entity-level data generation unit 112 may aggregate one or more related raw transactional data entries associated with the particular entity to generate the entity-level prediction input data entry. Aggregating particular raw transactional data entries may include one or more of summing the particular raw transactional data entries, averaging the particular raw transactional, selecting one raw transactional data entry of the particular raw transactional data entries, determining a derived data entry based at least in part on the particular raw transactional data entries (e.g., based at least in part on subject matter expertise), and/or the like. For example, to generate an entity-level prediction input data entry for a particular bank customer that indicates the highest-valued deposit account of the particular customer, the entity-level data generation unit 112 may obtain the current value for each deposit account associated with the particular customer and select the deposit account having the highest value as the highest-valued deposit account of the particular customer.

Some entity-level prediction input data entries are temporal entity-level prediction input data entries, where each temporal entity-level prediction input data entry describes at least one transactional reality associated with a corresponding entity over a particular period of time. Examples of temporal entity-level prediction input data entries including daily entity-level prediction input data entries and cross-daily entity-level prediction input data entries, such as monthly entity-level prediction input data entries. For example, a daily entity-level prediction input data entry for a customer entity may describe a number of withdrawals from an account associated with the customer entity over a particular day. As another example, a monthly entity-level prediction input data entry for a customer entity may describe a monthly active deposit account of the particular customer over a particular month.

In some embodiments, a cross-daily entity-level prediction input data entry for a customer entity over a period of time may describe one or more of aggregate account-level information/data for the customer entity over the period of time, aggregate transactional information/data for the customer entity over the period of time, and derived customer information/data for the customer entity over the period of time. For example, the aggregate account-level information/data for a first customer entity over a month may include a number of deposit accounts for which the first customer entity is a primary account holder over the month, a number of deposit accounts for which the first customer entity is a primary account holder or a qualified secondary account holder over the month, a number of loan accounts for which the first customer entity is a primary account holder over the month, a number of loan accounts for which the first customer entity is a primary account holder or a qualified secondary account holder over the month, a deposit account value of each deposit account for which the first customer entity is a primary account holder or a qualified secondary account holder over the month, a loan amount value of each loan account for which the first customer entity is a primary account holder or a qualified secondary account holder over the month, and/or the like.

As another example, the aggregate transactional information/data for a first customer entity over a month may include one or more of a number of total debit card transactions by the first customer entity over the month, a number of teller transactions by the first customer entity over the month, a number of total checks withdrawn from accounts of the first customer entity over the month, an aggregate value of total debit card transactions by the first customer entity over the month, an aggregate value of teller transactions by the first customer entity over the month, an aggregate value of total checks withdrawn from accounts of the first customer entity over the month, and/or the like. As yet another example, the derived information/data for a first customer entity over a month may include a preferred branch of the first customer entity over the month, the residence location of the first customer entity over the month, a corresponding business unit serving the first customer entity over the month, and/or the like.

In some embodiments, the cross-daily entity-level prediction input information/data for a particular entity is characterized by a periodicity (e.g., a monthly periodicity) and can be aggregated in two distinct formats: a vertical format and a horizontal format. When formatted vertically, the cross-daily entity-level prediction input information/data for a particular entity may include entries for more than one period defining the periodicity of information/data and thus the cross-daily entity-level prediction input information/data may include data entries of the same type that relate to different period. For example, when formatted vertically, the cross-daily entity-level prediction input information/data for a particular entity may include a first deposit account value for the particular entity during a first month, a second deposit account value for the particular entity during a second month, and so on. Thus, vertically-formatted entity-level prediction input information/data may be organized as a matrix where each row of the matrix represents an entity-level prediction input data entry per a period of time defined by the periodicity of the entity-level prediction input information/data. On the other hand, when formatted horizontally, the cross-daily entity-level prediction input information/data for a particular entity may include entries for a single period defined by the periodicity of the cross-daily entity-level prediction input information/data. In some embodiments, vertically-formatted entity-level prediction input information/data may be used to generate cross-period comparison reports (e.g., a report about a deposit account value across multiple months) and the horizontally-formatted entity-level prediction input information/data may be used to perform predicted analysis, e.g., to generate predicted business intelligence conclusions.

In some embodiments, the entity-level data generation unit 112 may generate entity-level prediction input information/data for a first entity based at least in part on the entity-level prediction input information/data for a second entity (e.g., a second entity that is deemed sufficiently similar to the first entity). In some embodiments, the entity-level data generation unit 112 may generate cross-daily entity-level prediction input information/data for a first entity over a first period based at least in part on the cross-daily entity-level prediction input information/data for the first entity over a second period. For example, the entity-level data generation unit 112 may generate cross-daily entity-level prediction input information/data for a first entity over a low-customer-activity period and/or an attrition period based at least in part on the cross-daily entity-level prediction input information/data for a period immediately before and/or after the low customer activity period and/or the attrition period.

Predictive Transactional Entity Analysis

At step/operation 402, the prediction engines 113 utilize the entity-level prediction input information/data and the prediction models retrieved from the storage unit 111 to generate engine predictions. Each prediction engine 113 may first determine a portion of the entity-level prediction input as prediction components for the prediction engine 113, where the prediction components for a particular prediction engine 113 are those entity-level prediction input data entries configured to serve as inputs to a prediction model utilized by the particular prediction engine 113. To determine its corresponding prediction components, a prediction engine 113 may determine entity-level prediction information/data to select data entries of particular types of particular periods of time. Thus, in one example, a prediction engine 113 may determine an entity value prediction for an entity based at least in part on entity-level prediction information/data for the entity and for the most recent month.

For example, the entity value prediction engine 121 may utilize entity-level prediction input information/data to detect a portion of the entity-level prediction input information/data configured to serve as inputs to the entity prediction model utilized by the entity value prediction engine 121 (e.g., the value prediction components) to determine one or more entity value predictions. Examples of value prediction components may include deposit account values for customer entities, credit-card-holder statuses for customer entities, and/or the like. As another example, the entity opportunity prediction engine 122 may utilize a portion of the entity-level prediction input information/data configured to serve as inputs to the opportunity prediction model utilized by the entity opportunity prediction engine 122 (e.g., the opportunity prediction components) to determine one or more opportunity predictions. As yet another example, the entity value loss prediction engine 123 may utilize a portion of the entity-level prediction input information/data configured to serve as inputs to the value loss prediction model utilized by the entity value loss prediction engine 123 (e.g., the value loss prediction components) to determine one or more value loss predictions. As a further example, the entity closure prediction engine 124 may utilize a portion of the entity-level prediction input information/data configured to serve as inputs to the entity closure prediction model utilized by the entity closure prediction engine 124 (e.g., the closure prediction components) to determine one or more closure predictions. In some embodiments, at least one of the opportunity prediction components, at least one of the value loss prediction components, and/or at least one of the closure prediction components are selected from (e.g., include all of) the value prediction components.

In some embodiments, an entity value prediction for a customer entity indicates the predicted value of the customer entity over a period of time (e.g., over a lifetime of the customer entity). To generate a customer entity value prediction, the entity value prediction engine 121 may process value prediction components related to sufficiently recent periods of time in accordance with an entity value prediction model that defines coefficient parameters for combining the value prediction components to generate the customer entity value prediction.

In some embodiments, an entity opportunity prediction for a customer entity indicates the predicted opportunity areas associated with the customer entity. In some embodiments, to generate a customer entity opportunity prediction for a particular customer, the entity opportunity prediction engine 122 may process opportunity prediction components related to sufficiently recent periods of time in accordance with an entity opportunity prediction model that defines coefficient parameters for combining the opportunity prediction components to generate the customer entity opportunity prediction. In some embodiments, to generate a customer entity opportunity prediction for a particular customer, the entity opportunity prediction engine 122 may determine an entity opportunity prediction for a customer entity by determining which first opportunity predicted components for the customer entity fall below and/or above an outlier threshold for the particular opportunity predicted components based at least in part on a distribution of the particular opportunity predicted components across multiple entities (e.g., across all customer entities associated with a bank). The entity opportunity prediction engine 122 may then select at least one of the first opportunity predicted components as the entity opportunity prediction for the customer entity.

In some embodiments, step/operation 402 may be performed at least in part in accordance with the various steps/operations of process 900 depicted in FIG. 9, which can be performed by prediction engines 113 of the prediction analysis computing entity 101. As depicted in process 11, the entity value prediction engine 121 first obtains the value prediction components 901 for a particular entity. For example, the entity value prediction engine 121 may retrieve the value prediction components 901 from the storage unit 111. In some embodiments, the value prediction components 901 include value-based prediction inputs, where a value-based prediction input is any value associated with an entity which can be utilized to determine an entity value prediction for the entity. Examples of value-based prediction inputs include account balances, transactional activity metrics, risk indicators, demographic information, etc.

After retrieving the value prediction components, the entity value prediction engine 121 generates scaled prediction components 902 by scaling each value prediction component 901 in accordance with a scaling factor associated with the value prediction component 901 and the particular entity. For example, a scaling factor may indicate that a deposit account balance for customer entity A may indicate that a particular value prediction component 901 indicating the deposit account balance of customer entity A should be multiplied by a particular value to generate a corresponding scaled prediction component 901 for the particular value prediction component 901. In some embodiments, at least some of the scaling values are trained parameters determined using a training algorithm, such as using gradient descent and/or gradient descent with backpropagation.

After generating the scaled prediction components 902, the entity value prediction engine 121 uses the generated scaled prediction components 902 to generate an entity value prediction for the particular entity (e.g., in accordance with an entity value prediction procedure and/or formula). Moreover, the entity value prediction engine 121 further provides the generated scaled prediction components 902 to other prediction engines as prediction components. For example, the entity value prediction engine 121 may provide at least a portion of the generated scaled prediction components 902 as opportunity prediction components to the entity opportunity prediction engine 122. As another example, the entity value prediction engine 121 may provide a least a portion of the generated scaled prediction components 902 as value loss prediction components to the entity value loss prediction engine 123. As a further example, the entity value prediction engine 121 may provide at least a portion of the generated scaled prediction components 902 as closure prediction components to the entity closure prediction engine 124.

Returning to FIG. 4, in some embodiments, generating entity value predictions may be performed in accordance with the various steps/operations of process 1000 depicted in FIG. 10, which can be performed by the entity value prediction engine 121. The process 900 starts at step/operation 901 when the entity value prediction engine 121 identifies a particular entity. At step/operation 902, the entity value prediction engine 121 identifies an entity tenure for the particular entity. In some embodiments, the entity tenure for the particular entity is a measure of whether the available value prediction components are likely to be predictive of the entity value. For example, the entity tenure for a customer entity may be determined based on a period of transactional activity and/or membership associated with the particular entity. In some embodiments, the entity value prediction engine 121 may determine that a newer member and/or a member of a recently acquired institution do not have sufficient transactional history that can be a basis for sufficiently predictive value prediction components for the customer entity.

At step/operation 903, the entity value prediction engine 121 determines whether the particular entity is high-tenured or low-tenured. In some embodiments, determining whether the particular entity is high-tenured or low-tenured may be determined based on the entity tenure for the particular entity and a tenure threshold. For example, if the entity tenure for the particular entity exceeds the tenure threshold, the entity value prediction engine 121 may determine that the particular entity is high-tenured; conversely, if the entity tenure for the particular entity fails to exceed the tenure threshold, the entity value prediction engine 121 may determine that the particular entity is low-tenured. In some embodiments, the tenure threshold may be determined at least in part based on one or more attributes of the particular entity. For example, different categories of particular entities (e.g., high-deposit customers and low-deposit customers) may have different tenure thresholds.

At step/operation 904, in response to determining that the particular entity is high-tenured, the entity value prediction engine 121 performs independent value prediction for the entity. The intendent entity value prediction may be performed based on a predictive model that is configured to generate an entity value prediction for an entity based on the value prediction components for the entity. For example, to perform the entity value prediction, the entity value prediction engine 121 may generate scaled prediction components for the particular entity based on the value prediction components for the particular entity, and subsequently utilize the scaled prediction components (e.g., in accordance with an entity value prediction procedure and/or formula) to generate an entity value prediction for the particular entity.

At step/operation 905, in response to determining that the particular entity is low-tenured, the entity value prediction engine 121 performs cross-entity value prediction for the entity. The cross-entity value prediction may be performed by using one or more cross-entity estimation properties associated with the particular entity to detect one or more proximate entities whose corresponding cross-entity estimation properties are deemed sufficiently similar to the cross-entity estimation properties of the particular entity, and subsequently utilize the entity value predictions for the one or more proximate entities to determine the entity value prediction for the particular entity. Thus, in some embodiments, the cross-entity value prediction provides an "indirect" way of estimating an entity value prediction for an entity deemed to have value predictive components deemed insufficiently predictive.

For example, to perform cross-entity value prediction for a recent customer entity, the entity value prediction engine 121 may detect other customer entities having deposit account values deemed sufficiently similar to the recent customer entity, and determine the customer value prediction for the particular customer based on the customer value predictions for the other customer entities deemed sufficiently similar to the recent customer entity. In some embodiments, mapping entities to each other using cross-entity estimation properties may be performed using a cross-entity estimation model, such as a cross-entity estimation model generated by applying spline functions to correlations between cross-entity properties and entity prediction values for a group of entities.

Returning to FIG. 4, n some embodiments, to determine a customer entity opportunity prediction for a customer entity, step/operation 402 may include the various steps/operations of process 500 depicted in FIG. 5. The various steps/operations of process 500, which can be performed by the entity opportunity prediction engine 122, are explained below using various examples, including the examples depicted in the operational example of FIG. 6.

As depicted in FIG. 5, at step/operation 501, the entity opportunity prediction engine 122 identifies the one or more opportunity prediction components for the customer entity. In some embodiments, the entity opportunity prediction engine 122 may select the one or more opportunity prediction components for the customer entity from the one or more value prediction components for the customer entity. In some embodiments, the entity opportunity prediction engine 122 selects all of the one or more value prediction components for the customer entity as the one or more entity opportunity predictions for the customer entity. For example, in the operational example of FIG. 6, the entity opportunity prediction engine 122 selects two value prediction components as opportunity prediction components: Expected Deposit Lifetime Revenue 601 (which for this particular customer entity is $550) and Debit Card Interchange Expected Lifetime Revenue 602 (which for this particular customer entity is $0).

At step/operation 502, the entity opportunity prediction engine 122 obtains a quantile regression distribution for each opportunity prediction component that indicates distribution of the opportunity prediction component across multiple customer entities (e.g., across all customer entities associated with a bank). For example, in the operational example of FIG. 6, the entity opportunity prediction engine 122 obtains the quantile regression distribution 611 for the opportunity prediction component 601 and the quantile regression distribution 612 for the opportunity prediction component 602. Each quantile regression distribution may be defined by one or more quantile regression distribution entries that each denote a boundary value of the corresponding opportunity prediction component that is satisfied by a particular ratio of the multiple customer entities associated with the quantile regression distribution. For example, in the quantile regression distribution 611 of FIG. 6, the quantile regression distribution entry 613 denotes that 20% of the multiple customer entries have a value of $214 or less for the corresponding opportunity prediction component 601. In some embodiments, the quantile regression distributes conform and/or fit entity characteristics, such as business units associated with customer entities.

At step/operation 503, the entity opportunity prediction engine 122 determines a non-outlier portion of each quantile regression distribution. To determine a non-outlier portion of a quantile regression distribution, the entity opportunity prediction engine 122 may first determine a non-minimum ratio of the quantile regression distribution, which is a ratio of the quantile regression whose quantile regression values are all below or equal to a minimum threshold value (e.g., zero). For example, in the operational example of FIG. 6, because only 5% of quantile regression values for the quantile regression distribution 611 are equal to or below zero, the quantile regression distribution 611 is 95% non-zero and thus has a non-minimum ratio of 95% (as denoted by the non-minimum distribution portion 621). As another example, because 50% of quantile regression values for quantile regression distribution 612 are equal to or below zero, the quantile regression distribution 612 is 50% non-zero and thus has a non-minimum ratio of 50% (as denoted by the non-minimum distribution portion 622).

In some embodiments, to determine a non-outlier portion of a quantile regression distribution and subsequent to determining the non-minimum ratio of the quantile regression distribution, the entity opportunity prediction engine 122 determines a non-outlier ratio of the quantile regression distribution based at least in part on the non-minimum ratio of the quantile regression distribution and an outlier parameter for the quantile regression distribution. In some embodiments, the entity opportunity prediction engine 122 may determine a non-outlier ratio of a quantile regression distribution using a variation of the following formula: 100%−(Non-minimum Ratio*Outlier Parameter). For example, in the operational example of FIG. 6, the entity opportunity prediction engine 122 may use an outlier parameter of % 40 to determine a non-outlier ratio of 100%−(95%*40%)=62% for the quantile regression distribution 611 and a non-outlier ratio of 100%−(50%*40%)=80%.

In some embodiments, to determine a non-outlier portion of a quantile regression distribution and subsequent to determining the non-outlier ratio of the quantile regression distribution, the entity opportunity prediction engine 122 may determine the non-outlier portion of the quantile regression distribution based at least in part on the non-outlier ratio of the quantile regression distribution. For example, the entity opportunity prediction engine 122 may determine the non-outlier portion of the quantile regression distribution as the portion of the quantile regression distribution below and including the smallest ratio that includes the outlier ratio. For example, in the operational example of FIG. 6, given its corresponding non-outlier ratio of 62%, the quantile regression distribution 611 has a corresponding non-outlier portion 631 defined by 70%. As another example, given its corresponding non-outlier ratio of 80%, the quantile regression distribution 612 has a corresponding non-outlier portion 632 defined by 80%.

At step/operation 504, the entity opportunity prediction engine 122 determines, for each quantile regression entry associated with a non-outlier portion of the quantile regression distribution, a scaled regression value. In some embodiments, to determine the scaled regression value for a quantile regression entry associated with a quantile regression distribution, the entity opportunity prediction engine 122 combines the quantile regression entry, the opportunity prediction component value associated with the quantile regression distribution, and the quantile regression ratio associated with the quantile regression entry. In some embodiments, to determine the scaled regression value for a quantile regression entry associated with a quantile regression distribution, the entity opportunity prediction engine 122 may use a variation of the following formula: (Quantile Regression Entry−Component Value)*(1−Quantile Regression Ratio). For example, in the operational example of FIG. 6, to determine the scaled regression value 641 for the 80% quantile regression ratio which is associated with the quantile regression entry $323, the entity opportunity prediction engine 122 may perform the following operations: ($323−$0)*(1−80%)=$64.6.

At step/operation 505, the entity opportunity prediction engine 122 determines the entity opportunity prediction for the customer entity based at least in part on each scaled regression value generated in step/operation 504. In some embodiment, the entity opportunity prediction engine 122 may select n (e.g., where n=1) opportunity prediction engines who have the highest associated with scaled regression values as areas of most predicted value generation opportunity. For example, in the operational example of claim 6, given n=1, the entity opportunity prediction engine 122 may determine the entity opportunity prediction for the customer entity based at least in part on the opportunity prediction component 602, which is associated with the highest scaled regression value (e.g., $64.6 for 80%).

Returning to FIG. 4, in some embodiments, an entity value loss prediction for a customer entity indicates the predicted value loss of the customer entity over a period of time (e.g., over a lifetime of the customer entity). To generate a customer entity value loss prediction, the entity value prediction engine 121 may process value loss prediction components related to sufficiently recent periods of time in accordance with an entity value loss prediction model that defines coefficient parameters for combining the value loss prediction components to generate the customer entity value loss prediction.

Moreover, in some embodiments, an entity closure prediction for a branch entity indicates the predicted effect of the branch entity closure on one or more non-branch entity value metrics (e.g., one or more customer value metrics). To generate a branch entity value loss prediction, the entity value prediction engine 121 may process value loss prediction components related to sufficiently recent periods of time in accordance with a branch closure prediction model that defines coefficient parameters for combining the closure prediction components to generate the branch closure value loss prediction. In some embodiments, the predicted effect of a first entity closure on a second entity (e.g., a bank branch entity closure on a customer entity) may be determined based on the pre-closure value prediction for the second entity, a transactional share of activities involving the first entity and the second entity (e.g., transactional share of bank activities performed by a customer entity that are conducted using a particular bank branch entity), and/or an alternative transactional relationship indication for the second entities (e.g., an indication of whether there are other eligible branch entities deemed available to a customer entity, such as branch entities located within a sufficient proximity of the customer entity, e.g., within a 7-mile vicinity of the customer entity). In some embodiments, the entity closure prediction for a bank branch entity may be generated based at least in part on net gain/loss values for the entity, such as the net gain/loss values depicted in column 710 of the branch performance table displayed via the interactive user interface 700 depicted in the operational example of FIG. 7.

Prediction-Based Actions

At step/operation 403, the prediction-based action engine 114 utilizes the engine predictions to initiate, execute, perform, and/or similar words used herein interchangeably one or more prediction-based actions. Examples of prediction-based actions include report generation, for example, report generation in response to user requests for particular reports. Examples of such reports include customer portfolio reports which may include a detailed reporting of customer-level data in a monthly calendar format; new customer vintage reports which may include information/data about customer statistics for new customers (e.g., customer attrition rates during the first n months of membership); customer lifetime value dynamic reports which may include information/data about how customer value is generated or lost across time periods; the opportunity sizing engine report which may include summary of entity opportunity predictions; deposit account reports which may include information/data about basic account-level information/data for deposit accounts, where customer accounts may be divided into segments based at least in part on customer-level attributes (e.g., deposit account balances and types by business units that manage particular customer entities); loan account reports which may include information/data about basic account-level information/data for deposit accounts, where customer accounts may be divided into segments based at least in part on customer-level attributes (e.g., deposit account balances and types by business units that manage particular customer entities); and portfolio monitoring reports which may include information/data generated by using statistical testing to detect movements in custom base across all customer segments.

In some embodiments, the prediction-based action engine 114 presents a prediction report associated with the one or more entity predictions to a user device. In some embodiments, the generated reports can be utilized to perform a variety of prediction-based actions, such as a variety of automatically-scheduled prediction action. As an example, in response to a report indicating that a particular customer is expected to experience a value loss, the system may perform an automatic promotional outreach to the customer based on a customer opportunity identified by a customer opportunity prediction report. As another example, in response to a report indicating a customer opportunity, the system may perform an automatic promotional outreach to the customer based on the customer opportunity identified in the noted report.

An example of a populated portal is depicted in the dynamic customer life-time value report portal 800 of FIG. 8, which shows various value measures 830 for various categories of customers 820 within a particular time period 810. For example, the dynamic customer life-time value report portal 800 depicts that new customers start the time period 810 with a $0 value but end the time period 810 with a $85,059,089 value, which amounts to an $85,059,089 growth value which is % 10.4 of total value growth of a particular institution. As another example, the dynamic customer life-time value report portal 800 depicts that those existing customers experiencing an increase in value prediction (e.g., organic CLTV value increase customers) start the time period 810 with a $61,2222 value but end the time period 810 with a $314,484,094 value, which amounts to an $242,548,170 growth value which is % 29.6 of total value growth of the particular institution.

Moreover, the prediction-based action engine 114 may utilize the engine predictions to populate various portals. Examples of portals include portals associated with Seacoast's RPS technology package. For example, in the banking context, prediction-based action engine 114 may utilize the engine predictions to generate data reporting interfaces for customers and/or for banking associates. In addition, the prediction-based action engine 114 may use the engine predictions to assign promotional leads to particular promotional managers. In some embodiments, the prediction-based action engine 114 may use the engine predictions to generate one or more promotional opportunity alerts. In some embodiments, the prediction-based action engine 114 may use the engine predictions to generate and/or perform one or more customer outreach campaigns, e.g., one or more automated customer outreach campaigns, such as one or more automated promotional outreach campaigns. Examples of customer outreach campaigns include lead generation operations, such as lead generation operations performed as part of the Seacoast's Connections technology package.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

For example, the foregoing description provides various examples of utilizing systems and methods for monitoring cognitive capability of a user. However, it should be understood that various embodiments of the systems and methods discussed herein may be utilized for providing reminders of any activity, such as exercising, eating healthy snacks, performing a particular task, calling another individual, and/or the like.

The invention claimed is:

1. A computer-implemented method for utilizing a value-based predictive input for a prediction entity of a plurality of prediction entities to reduce complexity of entity-level prediction data through selection of a subset of prediction engines with highest scaled regression values, the computer-implemented method comprising:
executing, by one or more processors, a machine learning algorithm trained using gradient descent, wherein executing the machine learning algorithm comprises:
generating the entity-level prediction data for the prediction entity based at least in part on raw transactional data and one or more entity-level aggregation rules;
generating aggregated entity-level data for the prediction entity based at least in part on aggregating the entity-level prediction data;
generating, based at least in part on the aggregated entity-level data, the value-based predictive input;
determining, based at least in part on the value-based predictive input, a plurality of predictive component values;
for each predictive component value of the plurality of predictive component values:
obtaining a quantile regression distribution for the predictive component value,
wherein the quantile regression distribution indicates a distribution of a corresponding predictive component that is associated with the predictive component value across the plurality of prediction entities via a plurality of quantile regression values,
determining a non-minimum ratio for the quantile regression distribution as a ratio of a non-minimum portion of the quantile regression distribution that falls below or equals a minimum threshold value, determining a non-outlier ratio for the quantile regression distribution based on a deviation between a full ratio and a product of the non-minimum ratio and an outlier parameter, determining a non-outlier portion of the quantile regression distribution as a subset of the quantile regression distribution that comprises each segment of the quantile regression distribution whose respective quantile regression values fall below or equals the non-outlier ratio, and generating, for each quantile regression value of the plurality of quantile regression values that is in the non-outlier portion, respective scaled quantile regression values based on the quantile regression value, the predictive component value, and a quantile regression ratio for the quantile regression value;

providing, by the one or more processors, the respective scaled quantile regression values, to a plurality of prediction engines;

selecting, by the one or more processors, from among the plurality of prediction engines, the subset of prediction engines with the highest quantile regression values as a most predicted value corresponding to the prediction entity;

determining, by the one or more processors and based at least in part on the selected prediction engines, one or more entity predictions for the prediction entity; and presenting, by the one or more processors, a prediction report associated with the one or more entity predictions to a user device.

2. The computer-implemented method of claim 1, further comprising:

determining, an outlier portion for a particular quantile regression distribution associated with a particular predictive component value of the plurality of predictive component values, by:

determining, by the one or more processors, a minimal ratio of the plurality of quantile regression values that exceed a minimal prediction threshold;

determining, by the one or more processors, the outlier parameter for the quantile regression distribution; and determining, by the one or more processors, the outlier portion based at least in part on the minimal ratio and the outlier parameter.

3. The computer-implemented method of claim 1, further comprising:

determining, by the one or more processors, based at least in part on the value-based predictive input for the prediction entity, an entity value prediction of one or more action-based predictive outputs.

4. The computer-implemented method of claim 1, further comprising:

determining, by the one or more processors, based at least in part on the value-based predictive input for the prediction entity, an entity value loss prediction of one or more action-based predictive outputs.

5. The computer-implemented method of claim 1, further comprising:

determining, by the one or more processors, based at least in part on the value-based predictive input for the prediction entity, an entity closure prediction of the one or more action-based predictive outputs.

6. The computer-implemented method of claim 1, further comprising:

identifying, by the one or more processors, branch associated data for the prediction entity; and determining, by the one or more processors, based at least in part on the branch association data and the value-based predictive input for the prediction entity, a branch closure prediction of the one or more action-based predictive outputs.

7. The computer-implemented method of claim 1, further comprising:

generating, by the one or more processors, the respective scaled quantile regression values based at least in part on a first quantile regression value, a first predictive component, and a first quantile regression ratio.

8. The computer-implemented method of claim 7, wherein generating the respective scaled quantile regression values comprises determining a product of a first difference between the first predictive component and the first quantile regression value and a another difference between the first quantile regression ratio and a base value.

9. The computer-implemented method of claim 1, further comprising determining an entity opportunity prediction by:

determining, by the one or more processors, an opportunity sizing recommendation based at least in part on a selected input income value.

10. The computer-implemented method of claim 1, further comprising:

generating, by the one or more processors, one or more recommendation reports based at least in part on one or more predictive outputs.

11. The computer-implemented method of claim 10, wherein each recommendation report of the one or more recommendation reports is selected from the group consisting of:

a customer portfolio report;
a new customer vintage report;
a customer lifetime value dynamic report;
an opportunity sizing engine report;
a deposit account report;
a loan account report; and
an anomalous portfolio change report.

12. The computer-implemented method of claim 1, further comprising:

generating, by the one or more processors, a commercial banking portal based at least in part on one or more predictive outputs.

13. The computer-implemented method of claim 1, further comprising:

determining, by the one or more processors, an entity tenure for the prediction entity, wherein the entity tenure indicates an estimated predictive capability of the plurality of predictive component values.

14. The computer-implemented method of claim 13, further comprising:

in response to determining that the entity tenure for the prediction entity exceeds a tenure threshold, determining, by the one or more processors, an entity value prediction of the one or more entity predictions by processing the plurality of predictive component values using an entity value prediction model.

15. The computer-implemented method of claim 13, further comprising:

in response to determining that the entity tenure for the prediction entity fails to exceed a tenure threshold, determining, by the one or more processors, an entity value prediction of the one or more entity predictions by performing a cross-entity value estimation for the prediction entity, wherein the cross-entity value estimation comprises:

identifying, by the one or more processors, a plurality of available prediction entities, wherein the plurality of available prediction entities comprises the prediction entity and one or more other prediction entities, and wherein each available prediction entity in the plurality of available prediction entities has cross-entity properties;

for each available prediction entity of the plurality of available prediction entities, determining, by the one or more processors, a cross-entity similarity measure between the cross-entity properties for a prediction engine and the cross-entity properties for the available prediction entity;

determining, by the one or more processors, from the plurality of available prediction entities, one or more proximate prediction entities for the prediction entity based on each cross-entity similarity measure for an available prediction entity of the plurality of available prediction entities; and determining, by the one or more processors, the entity value prediction for the prediction entity based on each proximate entity value prediction associated with a proximate prediction entity of the one or more proximate prediction entities.

16. The computer-implemented method of claim 1, wherein determining the plurality of predictive component values comprises:

obtaining, by the one or more processors, a plurality of value-based prediction components for the prediction entity;

obtaining, by the one or more processors, a plurality of predictive scaling factors associated with the prediction entity, wherein each predictive scaling factor of the plurality of predictive scaling factors is associated with a corresponding value-based prediction component of the plurality of value-based prediction components;

determining, by the one or more processors, the respective scaled quantile regression values by scaling each value-based prediction component of the plurality of value-based prediction components using a corresponding predictive scaling value of the plurality of predictive scaling factors; and determining, by the one or more processors, the plurality of predictive component values based on the respective scaled quantile regression values.

17. The computer-implemented method of claim 16, wherein each predictive scaling factor of the plurality of predictive scaling factors is determined based on one or more entity attributes of the prediction entity.

18. The computer-implemented method of claim 16, wherein determining the plurality of predictive component values based on the respective scaled quantile regression values comprises:

for each entity prediction of the one or more entity predictions, selecting, by the one or more processors, one or more prediction-specific scaled prediction values of the plurality of scaled predictive values based on one or more input properties of the prediction entity.

19. An apparatus for utilizing a value-based predictive input for a prediction entity of a plurality of prediction entities to reduce complexity of entity-level prediction data through selection of a subset of prediction engines with highest scaled regression values, the apparatus comprising at least one processor and at least one memory including program code executed by the processor, to at least:

execute a machine learning algorithm trained using gradient descent, wherein executing the machine learning algorithm comprises:

generating the entity-level prediction data for the prediction entity based at least in part on raw transactional data and one or more entity-level aggregation rules;

generating aggregated entity-level data for the prediction entity based at least in part on aggregating the entity-level prediction data;

generating, based at least in part on the aggregated entity-level data, the value-based prediction predictive input;

determining, based at least in part on the value-based predictive input, a plurality of predictive component values;

for each predictive component value of the plurality of predictive component values:

obtaining a quantile regression distribution for the predictive component value, wherein the quantile regression distribution indicates a distribution of a corresponding predictive component that is associated with the predictive component value across the plurality of prediction entities via a plurality of quantile regression values, determining a non-minimum ratio for the quantile regression distribution as a ratio of a non-minimum portion of the quantile regression distribution that falls below or equals a minimum threshold value, determining a non-outlier ratio for the quantile regression distribution based on a deviation between a full ratio and a product of the non-minimum ratio and an outlier parameter, determining a non-outlier portion of the quantile regression distribution as a subset of the quantile regression distribution that comprises each segment of the quantile regression distribution whose respective quantile regression values fall below or equals the non-outlier ratio, and generating, for each quantile regression value of the plurality of quantile regression values that is in the non-outlier portion, respective scaled quantile regression values based on the quantile regression value, the predictive component value, and a quantile regression ratio for the quantile regression value;

provide the respective scaled quantile regression values, to a plurality of prediction engines;

select, from among the plurality of prediction engines, the subset of prediction engines with the highest quantile regression values as a most predicted value corresponding to the prediction entity;

determine, based at least in part on the selected prediction engines, one or more entity predictions for the prediction entity; and present a prediction report associated with the one or more entity predictions to a user device.

20. A computer program product comprising at least one non-transitory computer-readable storage medium for utilizing a value-based predictive input for a prediction entity of a plurality of prediction entities to reduce complexity of entity-level prediction data through selection of a subset of prediction engines with highest scaled regression values, the non-transitory computer-readable storage medium having computer-readable program code portions embodied therein, the computer-readable program code portions comprising one or more executable portions configured to:

execute a machine learning algorithm trained using gradient descent, wherein executing the machine learning algorithm comprises:

generating the entity-level prediction data for the prediction entity based at least in part on raw transactional data and one or more entity-level aggregation rules;

generating aggregated entity-level data for the prediction entity based at least in part on aggregating the entity-level prediction data;

generating, based at least in part on the aggregated entity-level data, the value-based prediction predictive input;

determining, based at least in part on the value-based predictive input, a plurality of predictive component values;

for each predictive component value of the plurality of predictive component values:

obtaining a quantile regression distribution for the predictive component value, wherein the quantile regression distribution indicates a distribution of a corresponding predictive component that is associated with the predictive component value across the plurality of prediction entities via a plurality of quantile regression values, determining a non-minimum ratio for the quantile regression distribution as a ratio of a non-minimum portion of the quantile regression distribution that falls below or equals a minimum threshold value, determining a non-outlier ratio for the quantile regression distribution based on a deviation between a full ratio and a product of the non-minimum ratio and an outlier parameter, determining a non-outlier portion of the quantile regression distribution as a subset of the quantile regression distribution that comprises each segment of the quantile regression distribution whose respective quantile regression values fall below or equals the non-outlier ratio, and generating, for each quantile regression value of the plurality of quantile regression values that is in the non-outlier portion, respective scaled quantile regression values based on the quantile regression value, the predictive component value, and a quantile regression ratio for the quantile regression value;

provide the respective scaled quantile regression values, to a plurality of prediction engines;

select from among the plurality of prediction engines the subset of prediction engines with the highest quantile regression values as a most predicted value corresponding to the prediction entity;

determine, based at least in part on the selected prediction engines, one or more entity predictions for the prediction entity; and present a prediction report associated with the one or more entity predictions to a user device.

* * * * *

UNITED STATES PATENT AND TRADEMARK OFFICE
CERTIFICATE OF CORRECTION

PATENT NO. : 11,810,026 B2
APPLICATION NO. : 16/386913
DATED : November 7, 2023
INVENTOR(S) : Stillwell Page 1 of 1

It is certified that error appears in the above-identified patent and that said Letters Patent is hereby corrected as shown below:

In the Claims

Column 28,
Lines 14 and 15, in Claim 19, "prediction predictive" should read --predictive--.

Column 29,
Lines 15 and 16, in Claim 20, "prediction predictive" should read --predictive--.

Signed and Sealed this
Twenty-seventh Day of August, 2024

Katherine Kelly Vidal
*Director of the United States Patent and Trademark Office*